United States Patent
Wu

(10) Patent No.: US 8,494,453 B2
(45) Date of Patent: Jul. 23, 2013

(54) METHOD OF HANDLING MEASUREMENT AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 436 days.

(21) Appl. No.: 12/900,463

(22) Filed: Oct. 7, 2010

(65) Prior Publication Data

US 2011/0105043 A1    May 5, 2011

Related U.S. Application Data

(60) Provisional application No. 61/257,472, filed on Nov. 3, 2009.

(51) Int. Cl.
*H04B 17/00* (2006.01)

(52) U.S. Cl.
USPC ............ 455/67.11; 455/67.13; 455/63.1; 455/423; 455/450; 455/456.2; 455/65; 455/436; 370/241; 370/252; 370/331

(58) Field of Classification Search
USPC .......... 455/67.11, 67.13, 63.1, 423, 450, 455/456.1, 456.2, 65, 436, 437; 370/331, 370/332, 252, 241
See application file for complete search history.

(56) References Cited

U.S. PATENT DOCUMENTS

| | | | |
|---|---|---|---|
| 6,449,481 B1 * | 9/2002 | Kwon et al. | 455/437 |
| 6,845,238 B1 * | 1/2005 | Muller | 455/436 |
| 7,003,290 B1 * | 2/2006 | Salonaho et al. | 455/423 |
| 7,499,701 B2 * | 3/2009 | Salonaho et al. | 455/423 |
| 7,853,215 B2 * | 12/2010 | Kurek et al. | 455/67.11 |
| 7,890,094 B2 * | 2/2011 | Iwamura | 455/423 |
| 8,086,230 B2 * | 12/2011 | Iwamura | 455/423 |
| 8,095,075 B2 * | 1/2012 | Vadlamudi | 455/67.11 |
| 8,208,855 B2 * | 6/2012 | Lee et al. | 455/63.1 |
| 8,229,433 B2 * | 7/2012 | Parekh et al. | 455/436 |
| 2008/0095132 A1 | 4/2008 | Lindoff | |
| 2010/0159950 A1 * | 6/2010 | Toh et al. | 455/456.1 |
| 2010/0195507 A1 * | 8/2010 | Marinier et al. | 370/242 |
| 2010/0222059 A1 * | 9/2010 | Pani et al. | 455/436 |
| 2010/0238829 A1 * | 9/2010 | Sambhwani et al. | 370/252 |
| 2012/0002635 A1 * | 1/2012 | Chung et al. | 370/329 |

OTHER PUBLICATIONS

LG Electronics Inc., "Discussion on Measurement for CA", 3GPP TSG-RAN WG2 #66bis, R2-093877, Jun. 29-Jul. 3, 2009, Los Angeles, USA.
Office action mailed on Oct. 31, 2012 for the China application No. 201010535169.9, filing date Nov. 3, 2010, p. 1-8.
Ericsson, ST-Ericsson, "Activation and deactivation of component carriers", 3GPP TSG-RAN WG2 #68, Tdoc R2-096752, Oct. 9-13, 2009, Jeju, Korea, XP050391223, pp. 1-4.

(Continued)

*Primary Examiner* — Marceau Milord
(74) *Attorney, Agent, or Firm* — Winston Hsu; Scott Margo

(57) ABSTRACT

A method of handling measurement for a mobile device capable of communicating with a network through a maximum number of component carriers in a wireless communication system is disclosed. The method comprises receiving data with the maximum number of component carriers, receiving a command for deactivating one of the maximum number of component carriers, from the network, deactivating the component carrier indicated by the command, and performing an inter-frequency measurement without any measurement gap.

4 Claims, 4 Drawing Sheets

OTHER PUBLICATIONS

Qualcomm Europe, "RRM requirements for DB-DC-HSDPA", 3GPP TSG-WG4 Meeting #52bis, R4-093879, Oct. 12-16, 2009, Miyazaki, Japan, XP050393459.

Catt, "Measurement on deactivated CC", 3GPP TSG RAN WG2 Meeting #69bis, R2-102063, Apr. 12-16, 2009, Beijing, China, XP050422548.

Samsung, "Measurement on deactivated DL CCs", 3GPP TSG RAN WG2# 69bis, R2-102306, Apr. 12-16, 2010, Beijing, China, XP050422632.

Catt, "Measurement on Deactivated CC", 3GPP TSG RAN WG2 Meeting #69, R2-101055, Feb. 22-26, 2010, San Francisco, XP050421369.

Qualcomm Europe, "Measurement considerations for multicarrier operation", 3GPP TSG-RAN WG2 meeting #67bis, R2-095915, Oct. 12-16, 2009, Miyazaki, Japan, XP050390364.

NEC, "Details on Carrier Aggregation Signaling", 3GPP TSG-RAN WG2 #67bis, R2-095950, Oct. 12-16, 2009, Miyazaki, Japan, XP050390385, pp. 1-3.

Catt, "Measurement in CA", 3GPP TSG RAN WG2 meeting #67bis, R2-095485, Oct. 12-16, 2009, Miyazaki, Japan, XP050390041, pp. 1-4.

3GPP TS 36.300 V8.10.0 (Sep. 2009), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 8)", XP050377585, pp. 1-147.

European patent application No. 10014253.8, European Search Report mailing date: Mar. 4, 2011.

3GPP TR 36.814 V0.4.1 3rd Generation Partnership Project; Technical Specification Group Radio Access Network; Further Advancements for E-UTRA Physical Layer Aspects (Release 9), Feb. 2009.

3GPP TS 25.308 V9.1.0 3rd Generation Partnership Project; Technical Specification Group Radio Access Network; High Speed Downlink Packet Access (HSDPA); Overall description; Stage 2 (Release 9), Sep. 2009.

3GPP TS 36.321 V9.0.0 3rd Generation Partnership Project; Technical Specification Group Radio Access Network; Evolved Universal Terrestrial Radio Access (E-UTRA) Medium Access Control (MAC) protocol specification (Release 9), Sep. 2009.

3GPP R2-095808 Activation and deactivation of component carriers, Oct. 2009.

* cited by examiner

METHOD OF HANDLING MEASUREMENT AND RELATED COMMUNICATION DEVICE

CROSS REFERENCE TO RELATED APPLICATIONS

This application claims the benefit of U.S. Provisional Application No. 61/257,472, filed on Nov. 3, 2009 and entitled "Methods for measuring neighboring cells in multiple connections in wireless communications system" the contents of which are incorporated herein in their entirety.

BACKGROUND OF THE INVENTION

1. Field of the Invention

The application relates to a method utilized in a wireless communication system and a communication device thereof, and more particularly, to a method of handling measurement in a wireless communication system and a related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In the LTE system, a user equipment (UE) may perform measurement to measure communication quality, such as quality of a frequency layer or strength of a radio signal, which is controlled by the E-UTRAN, due to mobility of the UE. Measurement can be divided into two types according to the current operating frequency of the UE, which are an intra-frequency measurement and an inter-frequency measurement. The intra-frequency measurement is predominantly performed for the mobility within the same frequency layer (i.e. between cells with the same carrier frequency), whereas the inter-frequency measurement is predominantly performed for the mobility between different frequency layers (i.e. between cells with different carrier frequencies). Moreover, the inter-frequency measurement is performed during uplink/downlink idle periods, such as a measurement gap configured by the network. During the measurement gap, both the uplink and downlink transmissions are prohibited, and thereby the inter-frequency measurement can be performed within the measurement gap.

Toward advanced high-speed wireless communication system, such as transmitting data in a higher peak data rate, LTE-Advanced system is standardized by the 3rd Generation Partnership Project (3GPP) as an enhancement of LTE system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and/or transmitting.

In addition, COMP is considered for LTE-Advanced as a tool to improve coverage of high data rates, cell edge throughput, and system efficiency, which implies dynamic coordination among multiple geographical separated points. That is, when an UE is in a cell-edge region, the UE is able to receive signal from multiple cells, and the multiple cells can receive transmission of the UE.

In the LTE-Advanced system, a UE in a radio resource control (RRC) connected state is configured with multiple component carriers to receive data by the network (i.e. an eNB). In addition, the eNB can activate or deactivate any of the multiple component carriers by using a physical downlink control channel (PDCCH) order. Please note that, when one of the multiple component carriers is deactivated, the UE does not need to receive the corresponding PDCCH or physical downlink shared channel (PDSCH), nor require to perform channel quality indicator (CQI) measurement. Conversely, when one of the multiple component carriers is activated, the UE shall receive PDSCH and PDCCH, and is expected to be able to perform CQI measurement. However, the LTE-Advanced system does not clearly define whether the UE requires a measurement gap to measure an inter-frequency cell when one of the multiple component carriers is deactivated. In other words, the network does not know whether to configure the measurement gap to the UE or not. Improper configuration of the measurement gap may cause packet scheduling problems.

Furthermore, the abovementioned situation may occur in a universal mobile telecommunications system (UMTS). Dual cell operation is characterized as simultaneous reception of more than one high speed downlink shared channel (HS-DSCH) transport channel, and dual band operation is characterized as simultaneous reception of more than one HS-DSCH transport channel which are carried over more than one radio frequency band. Certain categories of UEs may be configured into dual cell operation/dual band operation in a CELL_DCH state, wherein dual cell operation/dual band operation may be activated and deactivated by high speed shared control channel (HS-SCCH) orders. Therefore, when the UE operated with the dual cell operation/dual band operation is configured with two carriers by a universal terrestrial radio access network (UTRAN), a serving node B of the UTRAN may deactivate one of the two carriers. However, the UMTS system does not clearly define whether the UE requires a measurement gap to measure an inter-frequency cell when one of the two carriers is deactivated.

SUMMARY OF THE INVENTION

The application discloses a method of handling measurement in a wireless communication system and a related communication device in order to solve the abovementioned problems.

A method of handling measurement for a mobile device capable of communicating with a network through a maximum number of component carriers in a wireless communication system is disclosed. The method comprises receiving data with the maximum number of component carriers, receiving a command for deactivating one of the maximum number of component carriers, from the network, deactivating the component carrier indicated by the command, and performing an inter-frequency measurement without any measurement gap.

A communication device of a wireless communication system comprising a network for handling measurement is disclosed. The communication device is capable of communicating with the network through a maximum number of component carriers, and comprises means for receiving data with the maximum number of component carriers, means for receiving a command for deactivating one of the maximum number of component carriers, from the network, means for deactivating the component carrier indicated by the command, and means for performing an inter-frequency measurement without any measurement gap.

These and other objectives of the present disclosure will no doubt become obvious to those of ordinary skill in the art after reading the following detailed description of the examples that are illustrated in the various figures and drawings.

DETAILED DESCRIPTION

Figure 1:
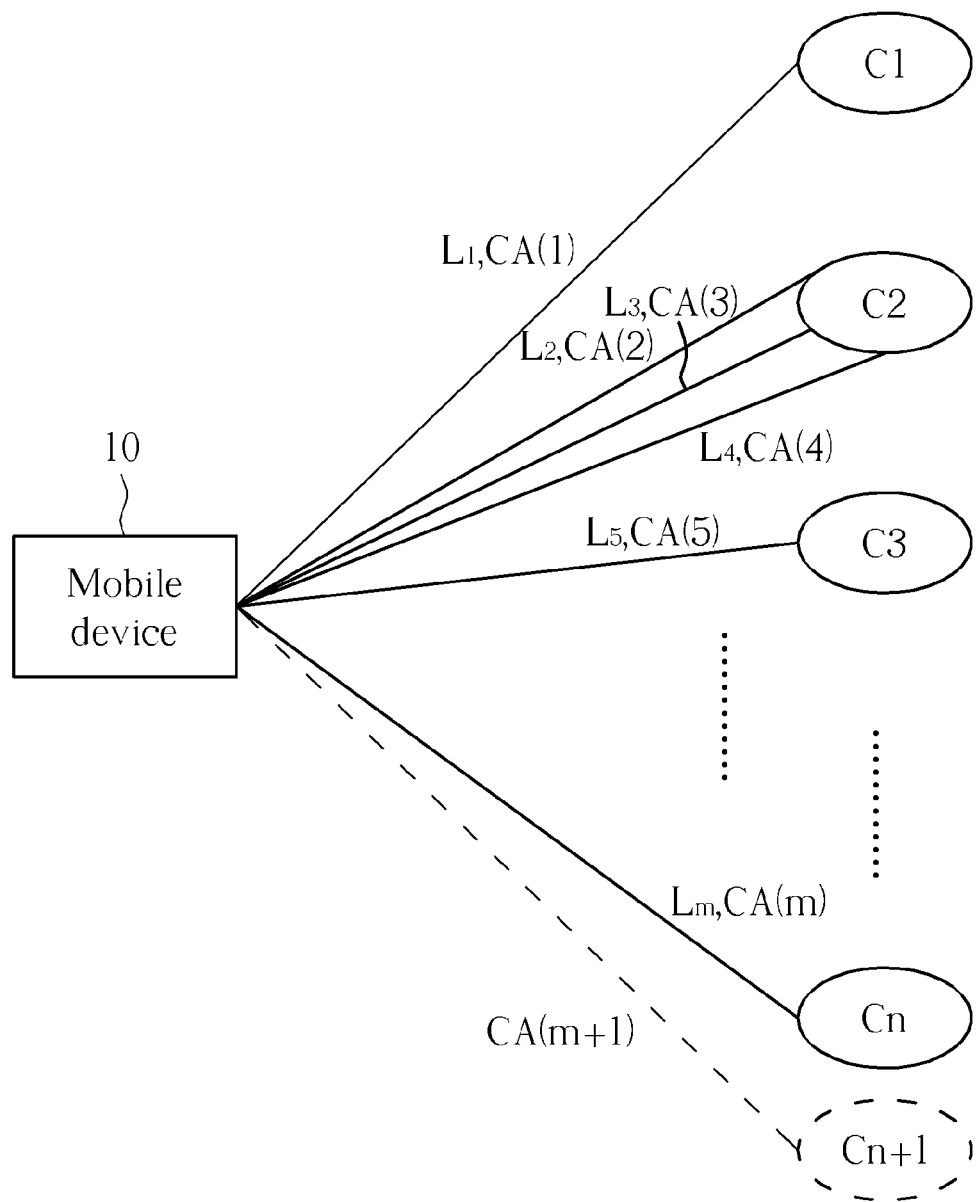
FIG. 1 illustrates a schematic diagram of an exemplary wireless communication system.

Please refer to FIG. 1, which illustrates a schematic diagram of a wireless communication system featuring multiple connections between a mobile device 10 and cells C1-Cn. The wireless communication system may be a LTE-Advanced system. The mobile device 10 can operate with carrier aggregation and COMP. In FIG. 1, the mobile device 10 communicates with the cells C1-Cn through radio links $L_1$-$L_m$ that correspond to component carriers CA(1)-CA(m) configured in the mobile device 10 respectively. Each of the component carriers CA(1)-CA(m) corresponds to a radio frequency (RF) channel whose bandwidth may be varied according to different communication systems. In addition, the mobile device 10 is referred as a user equipment (UE) or a mobile station (MS), and can be a device such as a mobile phone, a computer system, etc. The mobile device 10 may perform inter-frequency measurement for measuring signal strength of a component carrier CA(m+1) which has different carrier frequency from frequencies of the component carriers CA(1)-CA(m).

Figure 2:
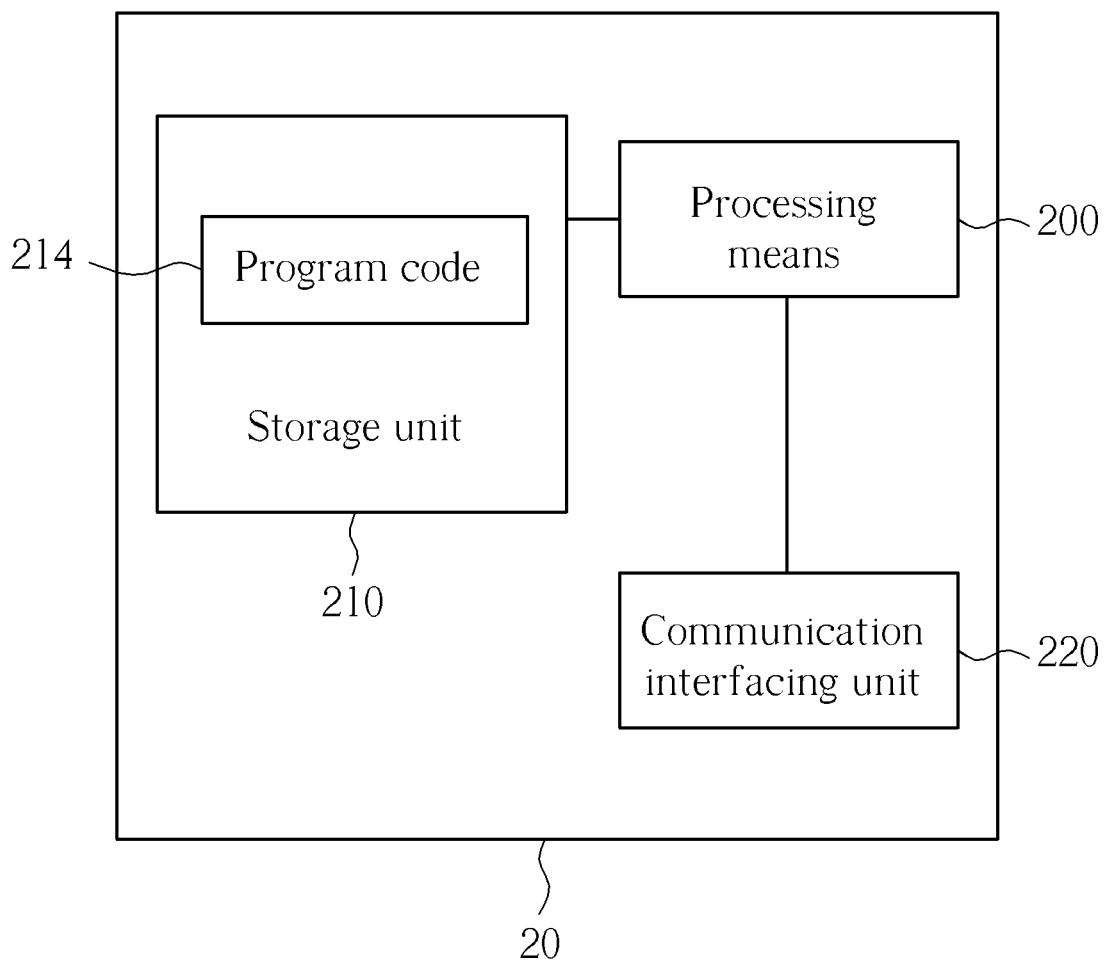
FIG. 2 illustrates a schematic diagram of an exemplary communication device.

FIG. 2 illustrates a schematic diagram of an exemplary communication device 20. The communication device 20 can be the mobile device 10 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
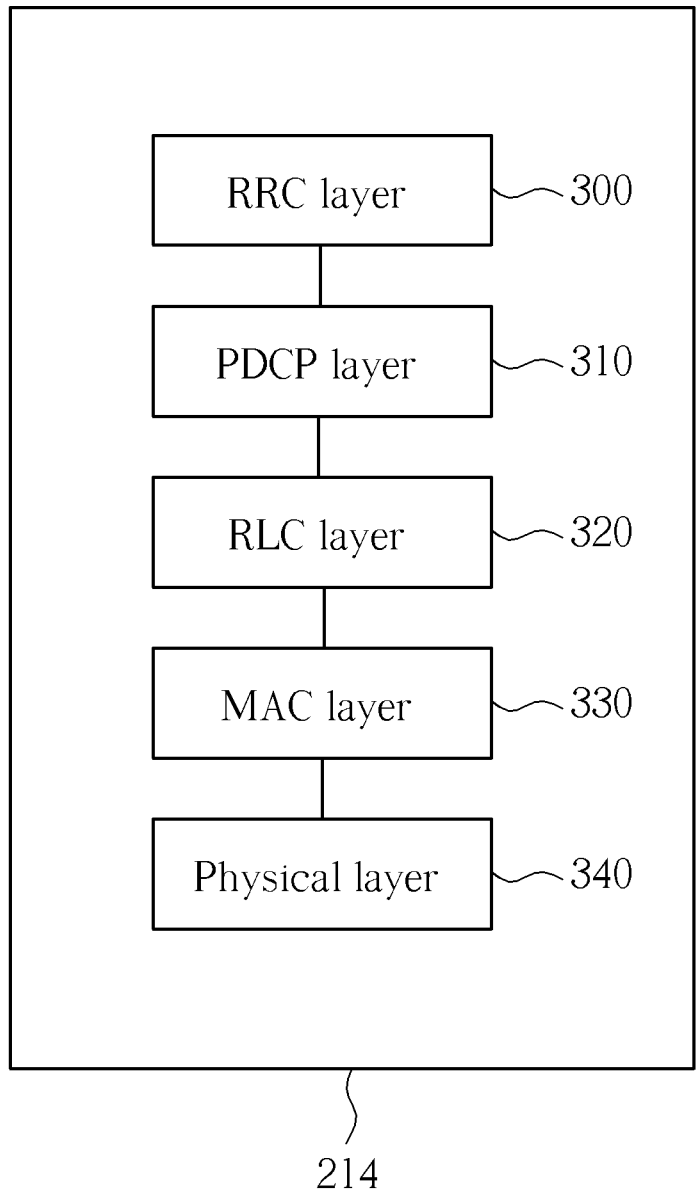
FIG. 3 illustrates a schematic diagram of communication protocol layers for an exemplary communication system.

Please refer to FIG. 3, which illustrates a schematic diagram of communication protocol layers for the LTE-Advanced system. The behaviors of some of the protocol layers may be defined in the program code 214 and executed by the processing means 200. The protocol layers from top to bottom are a radio resource control (RRC) layer 300, a packet data convergence protocol (PDCP) layer 310, a radio link control (RLC) layer 320, a medium access control (MAC) layer 330 and a physical (PHY) layer 340. The RRC layer 300 is used for performing broadcast, paging, RRC connection management, measurement reporting and control, and radio bearer (RB) control responsible for generating or releasing radio bearers (RBs). In addition, the RRC layer includes a RRC_CONNECTED state and a RRC_IDLE state.

Figure 4:
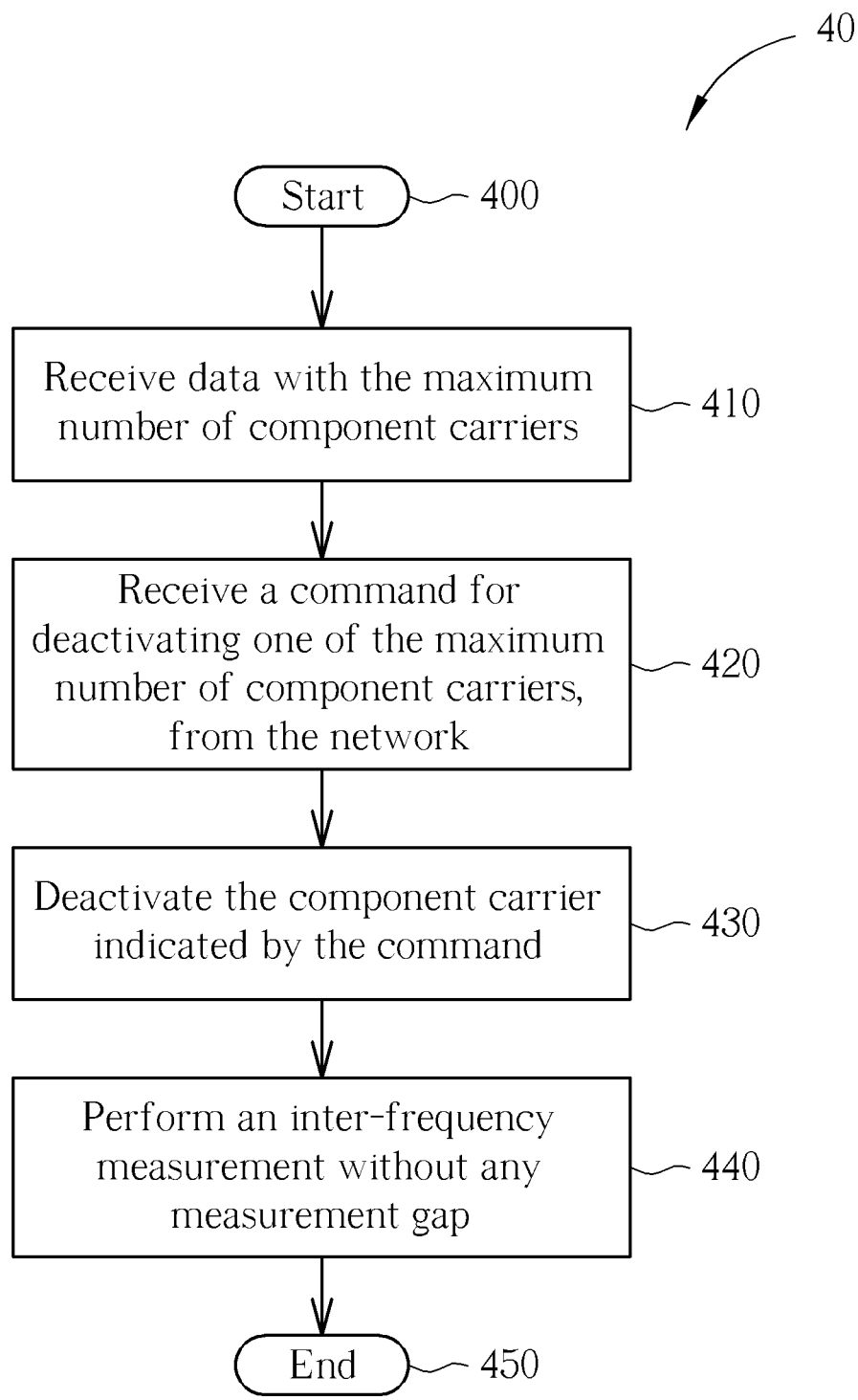
FIG. 4 is a flowchart of an exemplary process.

Please refer to FIG. 4, which illustrates a flowchart of an exemplary process 40. The process 40 is utilized in a UE, as the mobile device 10 of FIG. 1, capable of communicating with a network (i.e. C1-Cn) through a maximum number of component carriers for handling measurement. The process 40 can be compiled into the program code 214 and includes the following steps:

Step 400: Start.

Step 410: Receive data with the maximum number of component carriers.

Step 420: Receive a command for deactivating one of the maximum number of component carriers, from the network.

Step 430: Deactivate the component carrier indicated by the command.

Step 440: Perform an inter-frequency measurement without any measurement gap.

Step 450: End.

According to the process 40, the UE capable of receiving data on the maximum number of component carriers is configured with the maximum number of component carriers to receive data, and is required to perform the inter-frequency measurement. The UE performs the inter-frequency measurement without any measurement gap when one of the maximum number of component carriers is deactivated, whereas the UE uses a receiver configured to receive the deactivated component carrier to perform the inter-frequency measurement. In other words, the UE does not need the measurement gap for inter-frequency measurement, so that the network does not need to configure the measurement gap to the UE. Therefore, the system performance is improved by saving unnecessary RRC signaling for measurement gap configuration.

Please note that, the command may be a High Speed Shared Control Channel (HS-SCCH) order in a universal terrestrial radio access network (UTRAN), a Physical down Link Control Channel (PDCCH) order in an evolved universal terrestrial radio access network (E-UTRAN), a RRC message, or a MAC control element.

Referring back to FIG. 1, take an example based on the process 40. The UE capable of receiving data on maximum number "m" component carriers (m>1) is configured with "m" connections by the E-UTRAN in the RRC_CONNECTED state. That is, the UE receives data on the component carriers CA(1)-CA(m). In addition, the UE is required to measure an inter-frequency cell (e.g. the cell Cn+1) belonging to a component carrier CA(m+1) which is not one of the component carriers CA(1)-CA(m)) or to read system information of intra-frequency cell (e.g. the cell C1) or inter-frequency cell, but has not been configured any measurement gap. The UE may receive a command from the E-UTRAN to deactivate a first component carrier (e.g. the component carrier CA(2)) which is one of the component carriers CA(1)-CA(m). In this situation, the UE measures the inter-frequency cell or to read the system information of the inter-frequency or intra-frequency cell without any measurement gap. More specifically, the UE uses the receiver, which was previously configured for the first component carrier before receiving the deactivation command, to measure the inter-frequency cell or to read the system information of the inter-frequency cell or the intra-frequency cell.

The process 40 clearly specifies how the UE shall deal with the measurement with deactivation mechanism. The UE does not have any measurement gap configured but measures the inter-frequency cell or reads the system information of the intra-frequency cell or inter-frequency cell by using the receiver of the deactivated component carrier. In other words, the E-UTRAN does not configure the measurement gap to the UE, so that the packet scheduling is not interred by the measurement gap. Please note that, the process 40 can be applied to the UE of UMTS system, wherein the UE is operated with dual cell operation/dual band operation. The detail description can be referred from above, so it is not given herein.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary examples and means are provided for handling the measurement for the UE supporting data transfer of multiple connections (e.g. dual cell operation/dual band operation in UMTS system, or carrier aggregation or COMP in LTE-Advanced system), so as to make a correct measurement gap configuration, thereby avoiding affecting schedule of the component carrier(s) of the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling measurement for a mobile device capable of communicating with a network through a maximum number of component carriers in a wireless communication system, the method comprising:
    receiving data with the maximum number of component carriers;
    receiving a command for deactivating one of the maximum number of component carriers, from the network;
    deactivating the component carrier indicated by the command; and
    (1) performing an inter-frequency measurement without any measurement gap, comprising measuring at least an inter-frequency cell by using a receiver which was configured to receive the deactivated component carrier before receiving the command; or
    (2) reading system information of at least an intra-frequency cell or at least an inter-frequency cell without any measurement gap by using the receiver which was configured to receive the deactivated component carrier before receiving the command.

2. The method of claim 1, wherein the command is a High Speed Shared Control Channel (HS-SCCH) order in a universal terrestrial radio access network (UTRAN), or a Physical down Link Control Channel (PDCCH) order in an evolved universal terrestrial radio access network (E-UTRAN), or a radio resource control (RRC) message, or a medium access control (MAC) control element.

3. A communication device of a wireless communication system comprising a network for handling measurement, the communication device capable of communicating with the network through a maximum number of component carriers, comprising:
    means for receiving data with the maximum number of component carriers;
    means for receiving a command for deactivating one of the maximum number of component carriers, from the network;
    means for deactivating the component carrier indicated by the command; and
    (1) means for performing an inter-frequency measurement without any measurement gap, comprising means for measuring at least an inter-frequency cell by using a receiver which was configured to receive the deactivated component carrier before receiving the command; or
    (2) means for reading system information of at least an intra-frequency cell or at least an inter-frequency cell without any measurement gap by using the receiver which was configured to receive the deactivated component carrier before receiving the command.

4. The communication device of claim 3, wherein the command is a High Speed Shared Control Channel (HS-SCCH) order in a universal terrestrial radio access network (UTRAN), or a Physical down Link Control Channel (PDCCH) order in an evolved universal terrestrial radio access network (E-UTRAN), or a radio resource control (RRC) message, or a medium access control (MAC) control element.

* * * * *